US012703184B2

(12) United States Patent
Koike et al.

(10) Patent No.: US 12,703,184 B2
(45) Date of Patent: Aug. 11, 2026

(54) LIQUID REPLENISHMENT CONTAINER

(71) Applicant: SEIKO EPSON CORPORATION, Tokyo (JP)

(72) Inventors: Yuta Koike, Matsumoto (JP); Tadahiro Mizutani, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 153 days.

(21) Appl. No.: 18/755,006

(22) Filed: Jun. 26, 2024

(65) Prior Publication Data

US 2025/0001761 A1 Jan. 2, 2025

(30) Foreign Application Priority Data

Jun. 27, 2023 (JP) ................................ 2023-104660

(51) Int. Cl.
*B41J 2/175* (2006.01)

(52) U.S. Cl.
CPC ................................ *B41J 2/17509* (2013.01)

(58) Field of Classification Search
CPC .. B41J 2/17509; B41J 2/17523; B41J 2/1754; B41J 2/17553; B41J 29/13; B41J 2/17506; B41J 2/17513
USPC ........................................................ 347/84
See application file for complete search history.

(56) References Cited

U.S. PATENT DOCUMENTS

| | | | |
|---|---|---|---|
| 2019/0030903 A1* | 1/2019 | Fukasawa ................ | B41J 29/13 |
| 2022/0016893 A1 | 1/2022 | Nagai et al. | |
| 2022/0379623 A1 | 12/2022 | McCourt et al. | |

FOREIGN PATENT DOCUMENTS

| | | |
|---|---|---|
| EP | 3939794 A1 | 1/2022 |
| JP | 2022-018712 A | 1/2022 |

* cited by examiner

*Primary Examiner* — Douglas X Rodriguez
*Assistant Examiner* — Alexander D Shenderov
(74) *Attorney, Agent, or Firm* — Oliff PLC

(57) ABSTRACT

A liquid replenishment container includes a container body portion having an opening and configured to contain a liquid, a liquid outlet forming portion coupled to the container body portion and including a cylindrical portion that defines a liquid outflow path communicating with the opening, and a cap configured to be attached to and detached from the liquid outlet forming portion. The liquid outlet forming portion includes a valve disposed in the liquid outflow path, and when an engagement between the container body portion and the liquid outlet forming portion is a first engagement, and an engagement between the liquid outlet forming portion and the cap is a second engagement, the first engagement is a threaded engagement, and the second engagement has a fitting structure configured to be released in an axial direction without rotation.

5 Claims, 8 Drawing Sheets

LIQUID REPLENISHMENT CONTAINER

The present application is based on, and claims priority from JP Application Serial Number 2023-104660, filed Jun. 27, 2023, the disclosure of which is hereby incorporated by reference herein in its entirety.

BACKGROUND

1. Technical Field

The present disclosure relates to a liquid replenishment container.

2. Related Art

Hitherto, an ink jet printer that can perform printing on a print medium such as printing paper with ink by ejecting the ink from a print head toward the print medium has been known as an example of an ink ejecting apparatus. Examples of such an ink jet printer include an ink replenishment type printer that is used by replenishing ink in an ink tank.

US 2022/379623 discloses a liquid replenishment container for replenishing ink in such a type of ink jet printer. When the liquid replenishment container is mounted on the printer at the time of performing an ink injection operation for the first time, an inner plug is pushed by a needle on a printer side and disengaged, and the inner plug falls into a container body. As a result, an ink flow path is opened. Further, an ink outlet forming portion forming an ink flow path outlet is fixed to the container body by a ratchet structure.

Recently, as part of environmental conservation efforts, it is desirable to reuse containers rather than dispose of the containers. In the liquid replenishment container described in US 2022/379623, the ink outlet forming portion is fixed to the container body by the ratchet structure, and thus, it is difficult to remove the ink outlet forming portion from the container body. Therefore, it is difficult to take out the inner plug that has fallen into the container body or to reattach the inner plug to the ink outlet forming portion, which poses a problem in terms of reuse and recycling of a bottle. On the other hand, when the ink outlet forming portion and the container body are structured to be easily separated, there is a problem that a user may accidentally remove the ink outlet forming portion and be contaminated by ink.

SUMMARY

The present disclosure can be implemented in the following aspects.

According to a first aspect of the present disclosure, a liquid replenishment container is provided. The liquid replenishment container is a liquid replenishment container that replenishes a liquid in a liquid ejecting apparatus including a liquid introduction needle via the liquid introduction needle, the liquid replenishment container including: a container body portion having an opening and configured to contain the liquid; a liquid outlet forming portion coupled to the container body portion and including a cylindrical portion that defines a liquid outflow path communicating with the opening; and a cap configured to be attached to and detached from the liquid outlet forming portion, in which the liquid outlet forming portion includes a valve disposed in the liquid outflow path, and when an engagement between the container body portion and the liquid outlet forming portion is a first engagement, and engagement between the liquid outlet forming portion and the cap is a second engagement, the first engagement is a threaded engagement, and the second engagement has a fitting structure configured to be released in an axial direction without rotation.

According to a second aspect of the present disclosure, a liquid replenishment container is provided. The liquid replenishment container is a liquid replenishment container that replenishes a liquid in a liquid ejecting apparatus including a liquid introduction needle via the liquid introduction needle, the liquid replenishment container including: a container body portion having an opening and configured to contain the liquid; a liquid outlet forming portion coupled to the container body portion and including a cylindrical portion that defines a liquid outflow path communicating with the opening; and a cap configured to be attached to and detached from the liquid outlet forming portion, in which the liquid outlet forming portion includes a valve disposed in the liquid outflow path, and when an engagement between the container body portion and the liquid outlet forming portion is a first engagement, and engagement between the liquid outlet forming portion and the cap is a second engagement, each of the first engagement and the second engagement has a threaded fixing structure and is configured to be released by rotation, and a fixing force of the first engagement is greater than a fixing force of the second engagement.

DESCRIPTION OF EMBODIMENTS

A. First Embodiment

A1. Configuration of Printer 100

Figure 1:
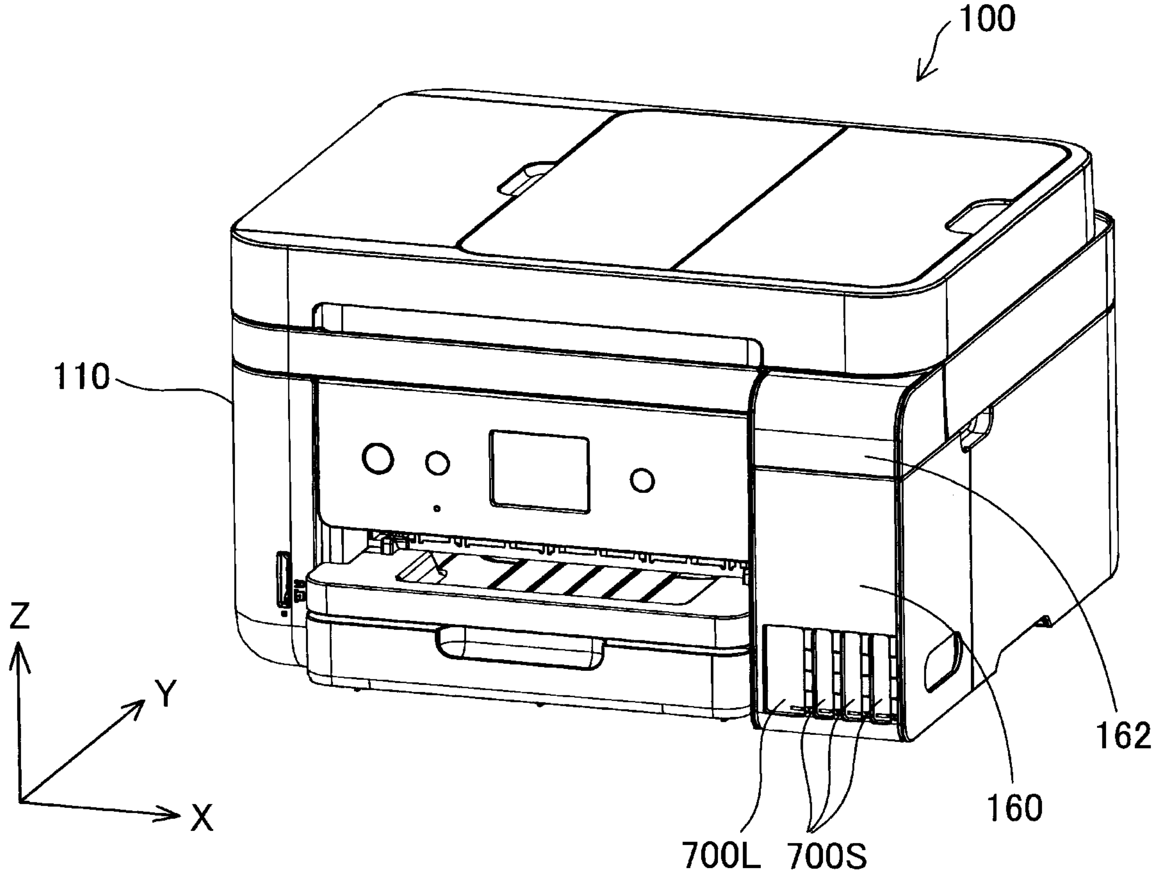
FIG. 1 is a perspective view of a printer in a first embodiment.

FIG. 1 is a perspective view of a printer 100 in a first embodiment. The printer 100 is an ink jet printer that performs printing by ejecting ink onto a print medium. The printer 100 corresponds to a "liquid ejecting apparatus". An X axis, a Y axis, and a Z axis orthogonal to each other are depicted in FIG. 1. The X axis corresponds to a width direction of the printer 100, the Y axis corresponds to a depth direction of the printer 100, and the Z axis corresponds to a height direction of the printer 100. The printer 100 is installed on a horizontal installation surface defined by an X direction and a Y direction. Note that an "X-axis direction" refers to a combination of a +X direction and a −X direction.

Similarly, a "Y-axis direction" refers to a combination of a +Y direction and a −Y direction, and a "Z-axis direction" refers to a combination of a +Z direction and a −Z direction.

The printer 100 includes a housing 110. A carriage (not illustrated) that is movable in a main scanning direction (X-axis direction) is provided inside the housing 110. A print head that ejects ink onto a print medium is installed on the carriage. An ink tank housing unit 160 that houses a plurality of ink tanks 700S and 700L is provided at one end of a front surface of the housing 110. The ink tank housing unit 160 includes an openable and closable lid 162 provided at an upper portion of the ink tank housing unit 160. The ink tank 700S is a small capacity tank, and the ink tank 700L is a large capacity tank. However, in the following description, the ink tank 700S and the ink tank 700L will be simply referred to as an "ink tank 700" without distinguishing between them.

Each ink tank 700 is coupled to the print head of the carriage by a tube (not illustrated). That is, the ink tank 700 is a stationary ink tank that is not mounted on the carriage of the printer 100. Furthermore, each ink tank 700 is an ink tank of an ink replenishment type that is replenished with ink from an ink replenishment container 1 described below when an ink level decreases. Although the ink tank 700 is a stationary ink tank in the present embodiment, the ink tank 700 may also be an ink tank mounted on the carriage of the printer 100.

Figure 2:
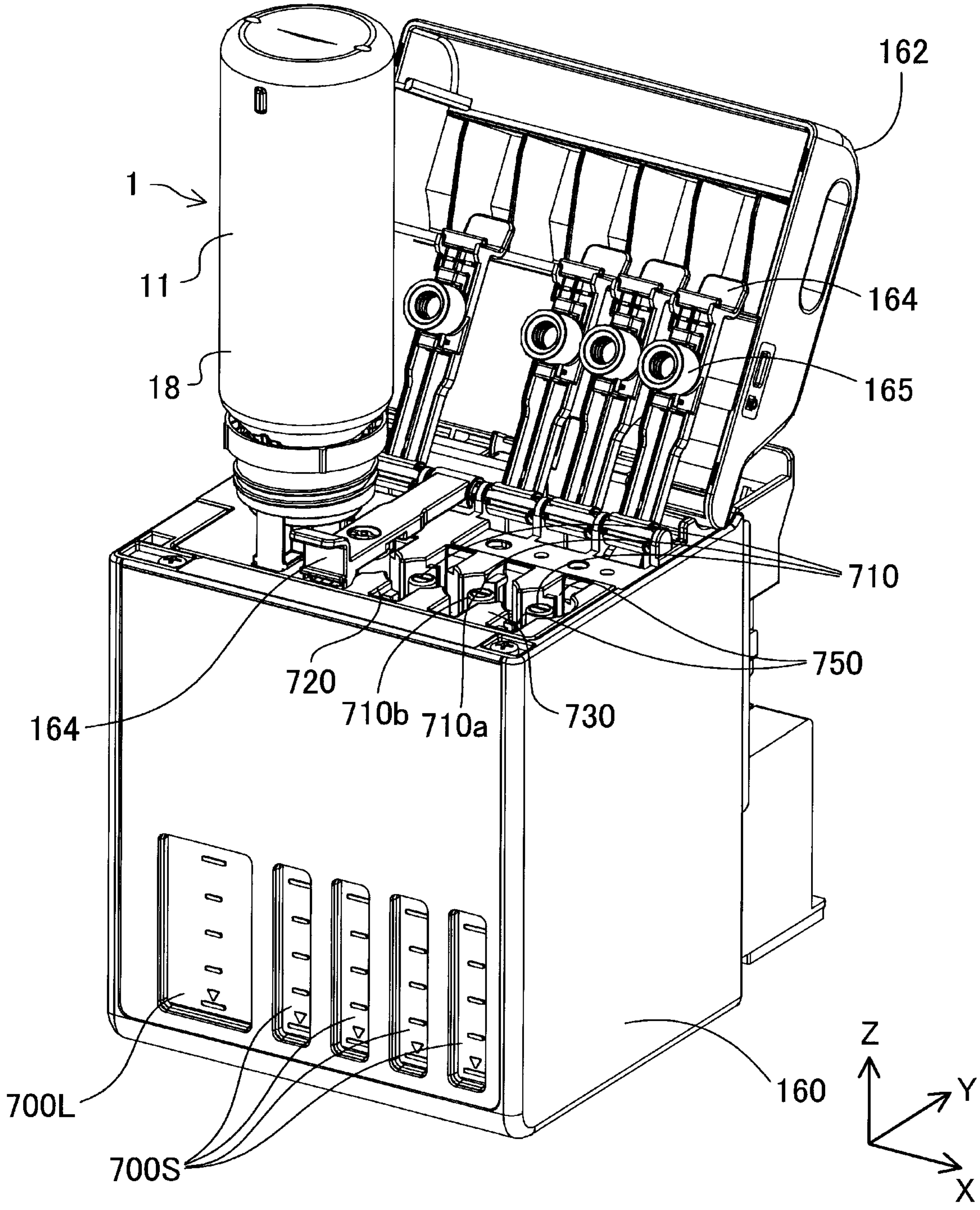
FIG. 2 is a perspective view illustrating a state in which an ink replenishment container is used to replenish ink in an ink tank.

FIG. 2 is a perspective view illustrating a state in which the ink replenishment container 1 is used to replenish ink in the ink tank 700. The ink replenishment container 1 corresponds to a "liquid replenishment container". A front surface of each ink tank 700 is made of a transparent or semi-transparent material, and the ink level in each ink tank 700 can be visually checked from the outside. When the ink level is low, it is possible to open the lid 162 and replenish ink through a liquid introduction needle 710 of the ink tank 700 as illustrated in FIG. 2.

The cylindrical liquid introduction needle 710 for replenishing ink in the ink tank 700 is provided on an upper surface of each ink tank 700. The ink tank housing unit 160 includes a sealing cap member 164 including a sealing cap 165 for sealing a distal end of the liquid introduction needle 710. When the ink tank 700 is not replenished with ink, the distal end of the liquid introduction needle 710 is sealed with the sealing cap 165 of the sealing cap member 164. When replenishing ink in the ink tank 700, the sealing cap 165 is removed from the liquid introduction needle 710, and a distal end portion of the ink replenishment container 1 is inserted into an ink inlet at which the liquid introduction needle 710 is provided to replenish the ink.

At this time, the ink is supplied from the ink replenishment container 1 to the ink tank 700 via the liquid introduction needle 710. The liquid introduction needle 710 includes a partition wall 710*a* that partitions the inside of the liquid introduction needle 710 into two flow paths. One of the two flow paths is used for ink to flow in, and the other is used for air to flow out from the ink tank 700 into the inside of the ink replenishment container 1. In a distal end surface of the liquid introduction needle 710 illustrated in FIG. 2, a distal end surface of the partition wall 710*a* and a distal end surface of a tubular portion 710*b* are positioned on the same horizontal plane. However, the distal end surface of the partition wall 710*a* may be positioned higher than the distal end surface of the tubular portion 710*b*.

In the present specification, the term "ink replenishment" refers to an operation of supplying ink to the ink tank 700 to increase the ink level. However, it is not necessary to fill the ink tank 700 full with ink by "ink replenishment". Furthermore, "ink replenishment" includes an operation of filling the empty ink tank 700 with ink when the printer 100 is used for the first time.

A2. Configuration of Ink Replenishment Container 1

Figure 3:
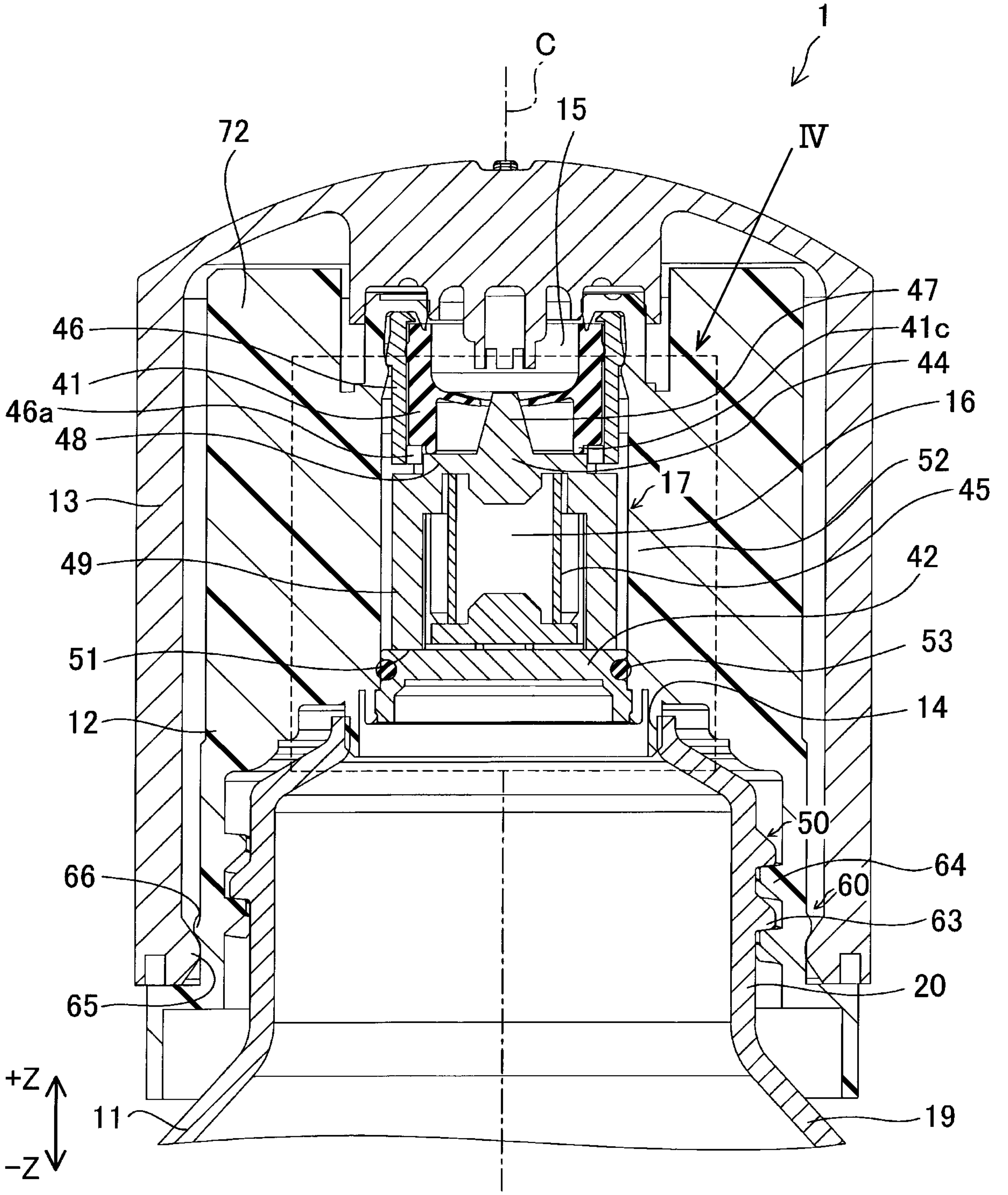
FIG. 3 is a cross-sectional view illustrating a part of the ink replenishment container according to the first embodiment.
Figure 4:
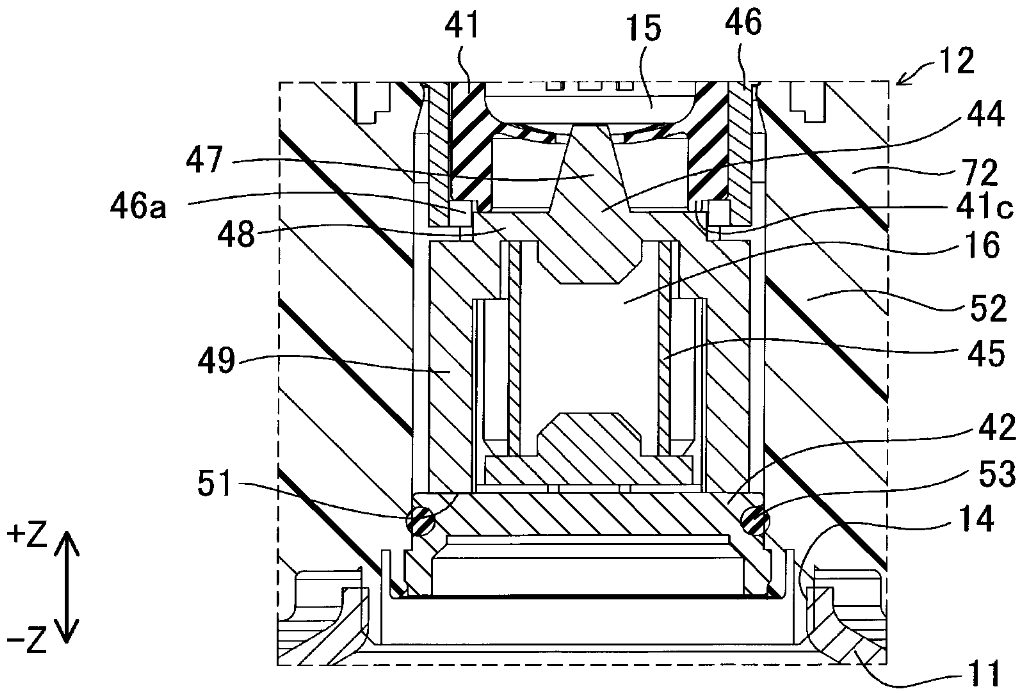
FIG. 4 is an enlarged view of a portion surrounded by a broken line in FIG. 3.
Figure 5:
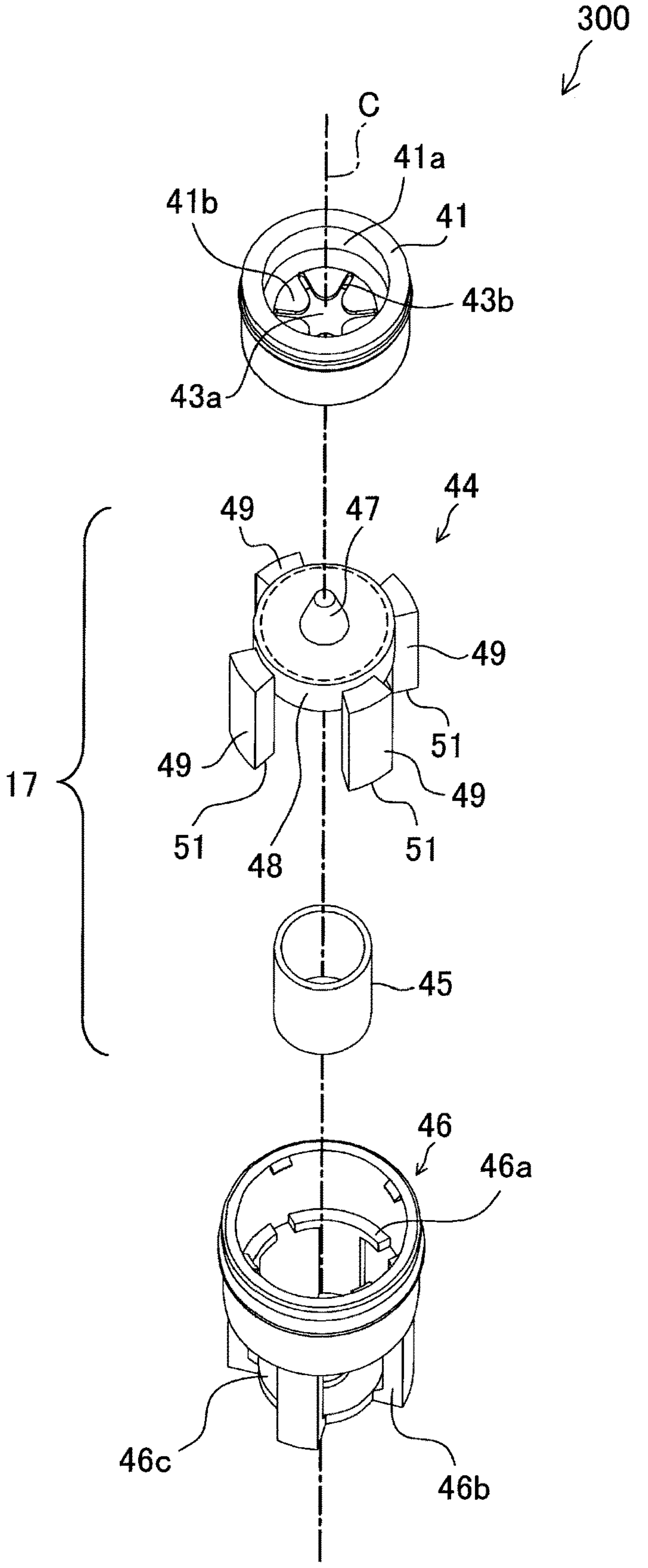
FIG. 5 is an exploded perspective view illustrating a part of an internal configuration of the ink replenishment container.
Figure 6:
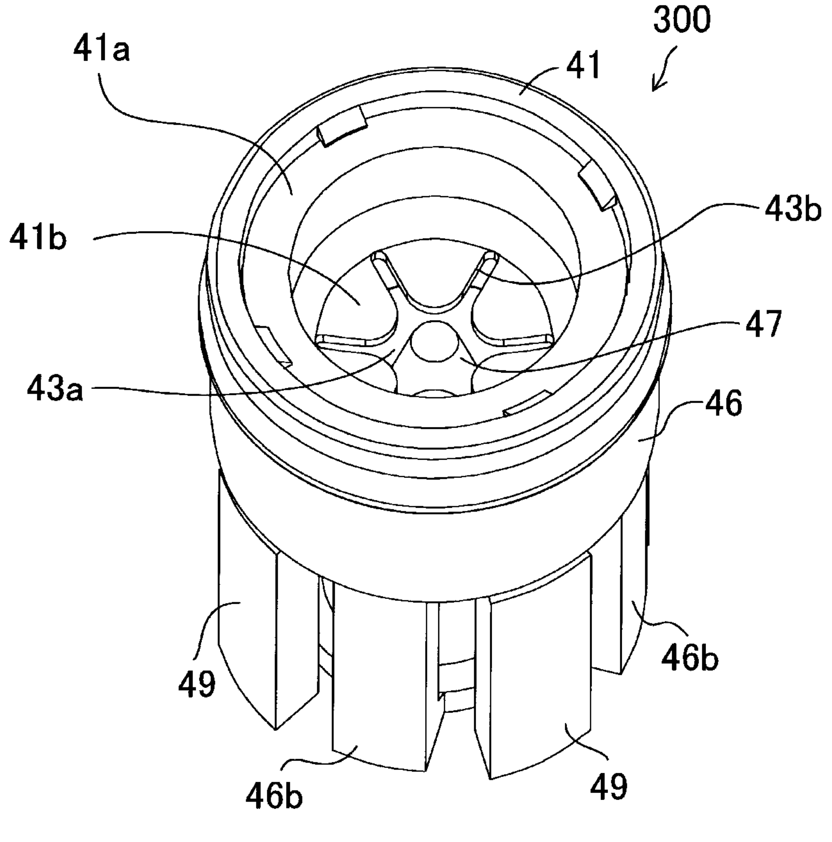
FIG. 6 is a perspective view illustrating an assembled valve unit.

Next, a configuration of the ink replenishment container 1 will be described with reference to FIGS. 3 to 6. FIG. 3 is a cross-sectional view illustrating a part of the ink replenishment container 1 according to the first embodiment. FIG. 3 illustrates an ink outlet forming portion 12 and a surrounding portion thereof when a cap 13 is mounted on the ink replenishment container 1, and illustrates a cross section in a plane passing through a central axis C of the ink replenishment container 1. FIG. 4 is an enlarged view of a portion surrounded by a broken line in FIG. 3. FIG. 5 is an exploded perspective view illustrating a part of an internal configuration of the ink replenishment container 1. FIG. 5 particularly illustrates an internal configuration of the ink outlet forming portion 12 positioned inside the cap 13. FIG. 6 is a perspective view illustrating an assembled valve unit 300.

As illustrated in FIGS. 3 and 4, the ink replenishment container 1 includes a container body portion 11 that has an opening 14 and is capable of containing ink therein, the ink outlet forming portion 12 coupled to the container body portion 11, and the cap 13 mounted on the ink outlet forming portion 12. The ink replenishment container 1 has a cylindrical bottle shape as a whole (see FIG. 2). In the following description of the ink replenishment container 1, a vertical direction of the ink replenishment container 1 standing alone on a horizontal plane is defined as a height direction, and the vertical direction illustrated in FIG. 3 is referred to as a "vertical direction". In the ink replenishment container 1, the ink outlet forming portion 12 and the cap 13 are positioned on an upper side of the container body portion 11.

The ink outlet forming portion 12 is a portion for dispensing ink from the inside of the container body portion 11 to the outside, the portion having an ink outlet 15 for dispensing ink contained in the container body portion 11. The ink outlet forming portion 12 is made of a resin. The ink outlet forming portion 12 corresponds to a "liquid outlet forming portion". An ink outflow path 16 is formed within a cylindrical portion 52 of the ink outlet forming portion 12 described below. The ink outflow path 16 corresponds to a "liquid outflow path", communicates with the opening 14, and includes the ink outlet 15 at a downstream end of the ink outflow path 16 in an ink outflow direction (liquid outflow direction). In other words, the ink outflow path 16 is an internal space defined by the cylindrical portion 52, and when a member defining a space is added to a distal end of the cylindrical portion 52 that is adjacent to the ink outlet 15, the ink outflow path 16 also includes the internal space. The ink outlet forming portion 12 includes a sealing member 41, a spring valve 17, and an inner plug 42. The sealing member 41, the spring valve 17, and the inner plug 42 are arranged with the central axes C aligned.

The sealing member 41 is made of an elastic material such as rubber or elastomer, and is disposed within the ink outlet 15. The sealing member 41 includes a sealing member cylindrical portion having the central axis C. Further, the sealing member 41 includes a wing-like portion 41*b* that extends in a radial direction from an inner circumferential wall 41*a* of the sealing member cylindrical portion toward the central axis C and has an arcuate cross section in a central axis direction. The wing-like portion 41*b* is formed in the form of each elastic piece divided by a slit 43*b* extending in a radiation direction or the radial direction from a through hole 43*a* formed at the center of a dome-shaped elastic membrane portion toward the inner circumferential wall 41*a* of the sealing member cylindrical portion.

The slit 43*b* may be a single slit extending diametrically through the through hole 43*a*. In a valve-closed state, a distal end of a valve body 44 described below is inserted into the through hole 43*a*, the valve body 44 being urged in a closing direction (upward). Further, in the valve-closed state, an upper surface of a disc portion 48 of the valve body 44 (a portion indicated by a circular broken line in FIG. 5) described below comes into close contact with an annular protruding portion 41*c* formed on a lower end surface of the sealing member 41. Therefore, in the ink outflow path 16, a space inside the inner circumferential wall 41*a* of the sealing member 41 and a space upstream of the internal space in the ink outflow direction are isolated from each other.

The spring valve 17 is disposed in the ink outflow path 16 of the ink outlet forming portion 12. In the spring valve 17, a spring member 45 pushes the valve body 44 toward the sealing member 41 in a non-replenishment state in which ink is not replenished in the ink tank 700. As a result, the spring valve 17 is in a valve-closed state in which the valve body 44 comes into contact with the sealing member 41, which makes it difficult for ink to leak to the outside. In a replenishment state in which ink is replenished in the ink tank 700, the ink replenishment container 1 is coupled to the liquid introduction needle 710 of the printer 100 in an upside-down position with the ink outlet 15 facing downward as illustrated in FIG. 2.

The liquid introduction needle 710 pushes the valve body 44 against an urging force of the spring member 45 of the spring valve 17 to form a gap between the valve body 44 and the sealing member 41, thereby allowing ink to flow through the ink outflow path 16. At this time, the partition wall 710*a* of the liquid introduction needle 710 pushes a truncated cone portion 47 of the valve body 44, the tubular portion 710*b* pushes the wing-like portion 41*b*, and the through hole 43*a* and the slit 43*b* are expanded to open the spring valve 17. As a result, ink flows from the ink outflow path 16 into the liquid introduction needle 710. The spring valve 17 is a normally closed valve.

In the present embodiment, the spring valve 17 includes at least the valve body 44, the spring member 45, and a contact portion 51, and these members are held by a holder portion 46. Furthermore, in the present embodiment, the holder portion 46 also holds the sealing member 41, and the valve unit 300 includes the spring valve 17, the sealing member 41, and the holder portion 46. The valve unit 300 is engaged with the cylindrical portion 52. The valve body 44 includes the truncated cone portion 47, the disc portion 48, and a side wall portion 49 arranged in this order from an ink outlet 15 side. The valve body 44 including the disc portion 48, and the side wall portion 49 may be provided as separate members in order to facilitate assembly. In this case, the side wall portion 49 may be held by the holder portion 46 together with the valve body 44. Alternatively, the holder portion 46 may be divided into two parts in the vertical direction.

When the ink outlet 15 is directed upward, that is, in the +Z direction, the truncated cone portion 47 is a truncated-cone-shaped portion that is provided at the center of the upper surface of the disc portion 48 and protrudes upward, and in the valve-closed state, an upper end of the truncated cone portion 47 protrudes upward from the through hole 43*a* of the sealing member 41. In a valve-open state, a distal end of the partition wall 710*a* of the liquid introduction needle 710 of the printer 100 comes into contact with a distal end surface of the truncated cone portion 47. Further, in the valve-closed state, a distal end surface of the disc portion 48 comes into close contact with the annular protruding portion 41*c* formed on the lower end surface of the sealing member 41 to close the ink outflow path 16. The side wall portion 49 is a columnar member of which a cross section in a horizontal plane orthogonal to the central axis C forms a part of an annular shape (a center angle of approximately 20°) and which extends downward from an outer circumferential surface of the disc portion 48. In the present embodiment, there are four side wall portions 49, which are provided at approximately equal intervals of 90 degrees in a circumferential direction of the disc portion 48. The side wall portion 49 extends from the disc portion 48 of the valve body 44 toward the container body portion 11 in a direction along the central axis C of the cylindrical portion 52.

In the present embodiment, the valve unit 300 has a configuration in which the spring valve 17 and the sealing member 41 are held inside the holder portion 46. The valve unit is disposed inside the cylindrical portion 52 and is detachably engaged with the cylindrical portion 52. The valve unit 300 may have a configuration in which the sealing member 41, the valve body 44, and the spring member 45 are each engaged with the cylindrical portion 52 without using the holder portion 46, instead of the configuration in which the sealing member 41, the valve body 44, and the spring member 45 are held by the holder portion 46. Alternatively, the sealing member 41 may be individually engaged with the cylindrical portion 52, and the valve body 44 and the spring member 45 may be engaged with the cylindrical portion 52 while being held by the holder portion 46. Various combinations are possible in the present embodiment. For example, the sealing member 41 may be held by the holder portion 46 and engaged with the cylindrical portion 52, and the valve body 44 and the spring member 45 may be individually engaged with the cylindrical portion 52.

The spring member 45 is a cylindrical coil spring and is provided on a lower surface of the disc portion 48 of the valve body 44 and on inner sides of the four side wall portions 49 in the radial direction. The spring member 45 urges the valve body 44 toward the sealing member 41 in the valve-closed state.

The contact portion 51 is a portion formed on an end surface (lower end surface) of the side wall portion 49 that is adjacent to the inner plug 42 in an axial direction, that is, the end surface of the side wall portion 49 that faces the inner plug 42. In the present embodiment, the side wall portion 49 is formed integrally with the valve body 44. Therefore, the contact portion 51 is formed integrally with the valve body 44 and comes into contact with the inner plug 42 at least when the valve 17 is in the valve-open state. The contact portion 51 functions as a portion that moves toward the container body portion 11 in conjunction with the valve body 44 in the valve-open state, and pushes the inner plug 42 toward the container body portion 11. Note that the contact portion 51 may be in contact with the inner plug 42 not only in the valve-open state but also in the valve-closed state. The holder portion 46 houses the sealing member 41, the spring member 45, and the valve body 44 therein.

The holder portion 46 includes a protrusion 46*a* formed along an inner circumferential wall and on which the sealing member 41 is mounted. Accordingly, when the liquid introduction needle 710 is inserted into an inner space of the sealing member 41, movement of the liquid introduction needle 710 in an insertion direction is restricted. Further, the holder portion 46 includes four pillars 46*b* that movably hold the valve body 44 along the central axis C, and a spring member support portion 46*c* that supports the spring member 45. The pillars 46*b* have outer surfaces shaped along an inner circumferential surface of the cylindrical portion 52, and a gap space penetrating in the radial direction is formed between adjacent pillars 46*b*. The gap space has a function of allowing air flowing in from the ink tank 700 to flow toward an inner wall of the cylindrical portion 52 positioned outward in the radial direction from the central axis C and allowing ink flowing out from the container body portion 11 to flow from the inner wall of the cylindrical portion 52 toward the central axis C positioned inward in the radial direction, so that ink and air can be easily separated in the valve-open state. However, in the present embodiment, the side wall portion 49 is disposed in the gap space.

The ink outlet forming portion 12 is provided with a pair of identification structure portions 72 arranged to interpose the cylindrical portion 52 therebetween in the radial direction. The identification structure portion 72 has a different shape depending on the type of ink contained in the ink replenishment container 1, and is used to appropriately replenish a type of ink corresponding to the ink in the ink tank 700.

The cylindrical portion 52 is coupled to the opening 14 of the container body portion 11. The inner plug 42 is positioned between the spring valve 17 and the opening 14 in a direction along the central axis C, and is engaged with the cylindrical portion 52 via a seal ring 53. The inner plug 42 is a cap-like member having a cylindrical shape with a bottom, and corresponds to a flow path closing member that closes the ink outflow path 16. When the ink replenishment container 1 is used for the first time, the ink replenishment container 1 is coupled to the liquid introduction needle 710 of the printer 100 as illustrated in FIG. 2. Since the liquid introduction needle 710 presses the valve body 44, the inner plug 42 is pressed by the contact portion 51. As a result, the inner plug 42 is separated from the ink outlet forming portion 12 and falls into the container body portion 11.

As illustrated in FIGS. 2 and 3, the container body portion 11 includes a cylindrical large diameter portion 18 having a bottom on a side opposite to the opening 14 in the direction along the central axis C. The container body portion 11 occupies approximately ½ or more and ⅔ or less of a length of the ink replenishment container 1 in the direction along the central axis C, and serves as a body portion of the ink replenishment container 1.

The ink outlet forming portion 12 is coupled to an upper end of the container body portion 11. The ink outlet forming portion 12 is made of a resin. The container body portion 11 includes, in order from the bottom, the large diameter portion 18 (see FIG. 2), a reduced diameter portion 19 coupled to the large diameter portion 18 and whose diameter gradually decreases, and a small diameter portion 20 having a constant diameter and coupled to an upper end of the reduced diameter portion 19 that has a reduced diameter. The diameter of the small diameter portion 20 is smaller than a diameter of a lower end of the ink outlet forming portion 12, and the ink outlet forming portion 12 is coupled to an outer side of the container body portion 11. A male threaded portion 63 is formed on an outer circumference of the small diameter portion 20 of the container body portion 11 and protrudes outward in the radial direction.

When assembling the ink outlet forming portion 12 to the container body portion 11, a female threaded portion 64 of the ink outlet forming portion 12 is engaged with the male threaded portion 63 of the container body portion 11 by a threaded engagement. Thereby, the ink outlet forming portion 12 and the container body portion 11 are coupled to each other. Therefore, a user cannot easily remove the ink outlet forming portion 12 from the container body portion 11. However, since the engagement is made by a threaded engagement, the ink outlet forming portion 12 and the container body portion 11 can be separated when reusing the ink replenishment container 1. The engagement between the female threaded portion 64 of the ink outlet forming portion 12 and the male threaded portion 63 of the container body portion 11 is also referred to as "first engagement 50". As described above, the first engagement 50 is a threaded engagement.

The cap 13 is mounted on an outer circumference of the ink outlet forming portion 12, covers the ink outlet forming portion 12, and shields the inside of the container body portion 11 from the outside air. A cap-side protruding portion 65 that protrudes inward in the radial direction over the entire circumference is formed at an end portion of an inner circumference of the cap 13 that is adjacent to the container body portion 11. An ink-outlet-forming-portion-side protruding portion 66 that protrudes outward in the radial direction is formed over the entire outer circumference of the ink outlet forming portion 12 at a position that substantially faces the cap-side protruding portion 65 when the cap 13 is mounted. Each of the cap-side protruding portion 65 and the ink-outlet-forming-portion-side protruding portion 66 may be formed only at a part of the entire circumference.

When assembling the cap 13 to the ink outlet forming portion 12, the cap 13 is placed over the ink outlet forming portion 12 from above and pushed in the axial direction. At this time, when the cap-side protruding portion 65 passes over the ink-outlet-forming-portion-side protruding portion 66 and reaches a position below the ink-outlet-forming-portion-side protruding portion 66, the cap-side protruding portion 65 and the ink-outlet-forming-portion-side protruding portion 66 are engaged with each other. When removing the cap 13, the cap 13 can be separated from the ink outlet forming portion 12 by pulling the cap 13 upward in the axial direction.

As described above, an engagement structure between the cap 13 and the ink outlet forming portion 12 has a fitting structure in which the cap 13 and the ink outlet forming portion 12 can be separated in a direction of the central axis C by relative movement in the direction of the central axis C without rotation. Hereinafter, the engagement between the cap 13 and the ink outlet forming portion 12 will also be referred to as "second engagement 60". The second engagement 60 is a structure called a "snap fit", for example. The first engagement 50 and the second engagement 60 are at approximately the same height position.

With the ink replenishment container 1 according to the first embodiment described above, the following effects can be achieved.

(1) According to the first embodiment, the ink outlet forming portion 12 and the container body portion 11 are engaged by the threaded engagement (the first engagement 50), and thus, the ink outlet forming portion 12 and the container body portion 11 can be separated from each other. Accordingly, it becomes possible to reuse the ink outlet forming portion 12 and the container body portion 11, and to easily take out, replace, and reinstall the flow path closing member (the inner plug 42 in the first embodiment).

(2) The cap 13 and the ink outlet forming portion 12 are not engaged by the threaded engagement, but are fitted in such a way as to be detachable from each other in the axial direction without rotation (the second engagement 60). Therefore, when the user pulls the cap 13 in the axial direction to remove the cap 13 from the ink outlet forming portion 12, the threaded engagement between the ink outlet forming portion 12 and the container body portion 11 is not released, that is, at least one of the ink outlet forming portion 12 or the container body portion 11 is not rotated around the central axis C, so that it is possible to prevent the ink outlet forming portion 12 from being accidentally separated from the container body portion 11. Therefore, it is possible to prevent the user from being contaminated by ink due to an operation such as removing the cap 13.

(3) According to the first embodiment, the inner plug 42 is simply removed. When the inner plug 42 is a component that breaks, it is necessary to remove the remaining part at the time of reuse. However, the inner plug 42 does not require such removal processing, and it is sufficient that a new inner plug 42 or a reused inner plug 42 is engaged with the ink outlet forming portion 12 again, which facilitates recycling.

(4) According to the first embodiment, in the ink replenishment container 1 including the spring valve 17, the spring valve 17 includes the contact portion 51 that moves in conjunction with the valve body 44 and comes into contact with the inner plug 42. Then, the inner plug 42 is separated by a pressure from an ink introduction needle to open the ink outflow path 16. Therefore, even when the ink replenishment container 1 is in the upside-down position, ink can be prevented from leaking to the outside from the container body portion 11 until the ink introduction needle is inserted.

(5) Furthermore, compared to a slit valve, the spring valve 17 is difficult to open even when subjected to an impact or when the inside of the ink replenishment container 1 is pressurized. Therefore, even after the inner plug 42 is separated when the ink replenishment container 1 is used for the first time, ink leakage is unlikely to occur even when performing the second and subsequent ink injection operations using the remaining ink in the ink replenishment container 1.

(6) According to the first embodiment, the contact portion 51 is formed integrally with the valve body 44, and thus, the contact portion 51 is urged toward the ink outlet 15 by the spring member 45. Therefore, even when the ink replenishment container 1 is subjected to some kind of impact before being coupled to the ink introduction needle, the inner plug 42 is unlikely to be separated. In addition, the contact portion 51 is formed on the end surface of the side wall portion 49 in the axial direction, the side wall portion 49 being formed in the axial direction and the end surface being adjacent to the inner plug 42 in the axial direction. Therefore, when the valve body 44 is pushed by the ink introduction needle, the inner plug 42 can be properly pushed toward the container body portion 11 and separated by being guided by the cylindrical portion 52.

B. Second Embodiment

Figure 7:
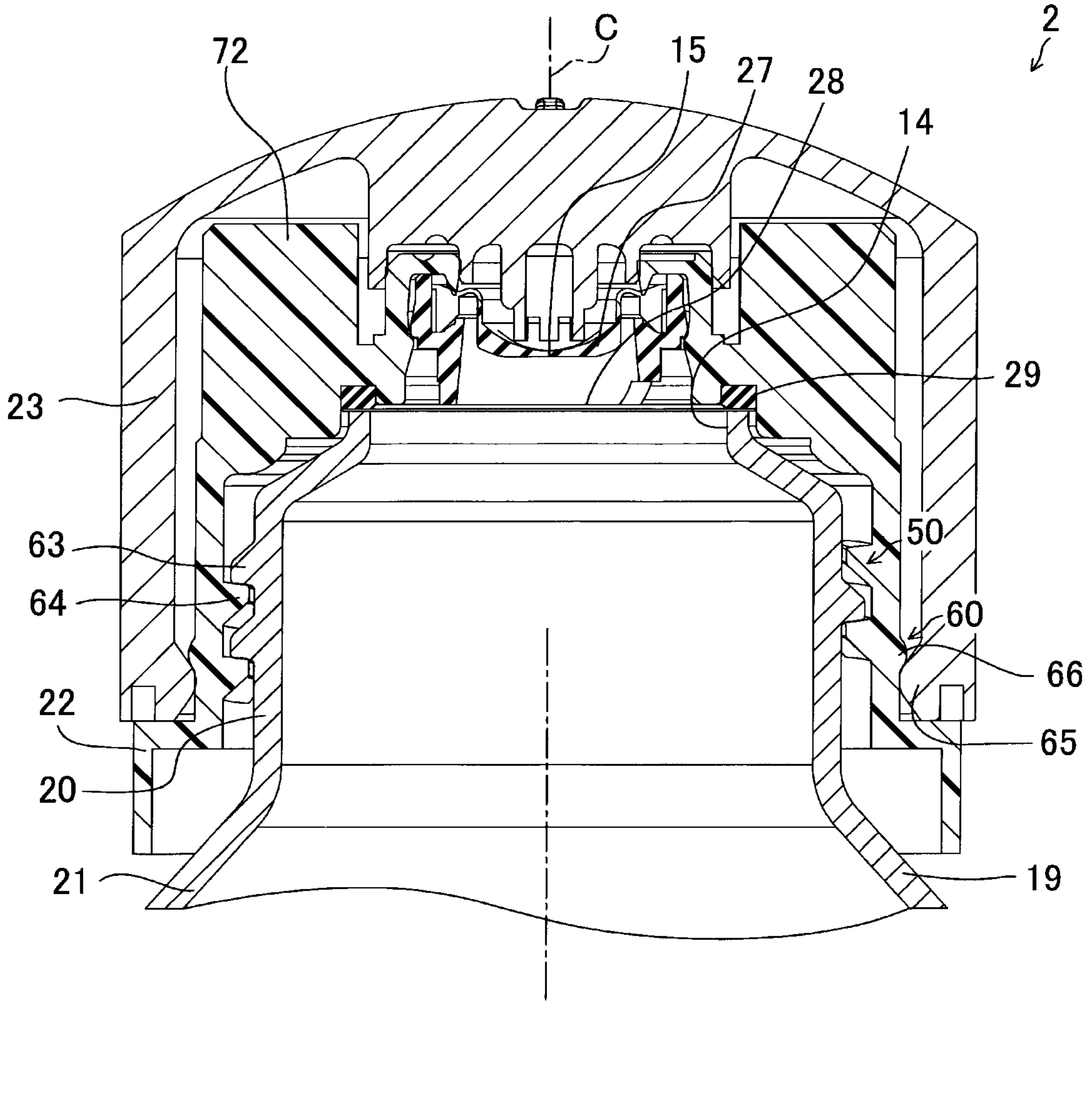
FIG. 7 is a cross-sectional view illustrating a part of an ink replenishment container according to a second embodiment.

Next, an ink replenishment container 2 according to a second embodiment of the present disclosure will be described with reference to FIG. 7. In multiple embodiments described below, substantially similar configurations to those in the first embodiment are denoted by the same reference signs, and a description thereof will be omitted. FIG. 7 is a cross-sectional view illustrating a part of the ink replenishment container 2 according to the second embodiment. FIG. 7 mainly illustrates a surrounding portion of a cap 23 of the ink replenishment container 2, and illustrates a cross section in a plane passing through a central axis C.

The ink replenishment container 2 according to the second embodiment is similar to that of the first embodiment in that the ink replenishment container 2 includes a container body portion 21, an ink outlet forming portion 22, and the cap 23, and the ink replenishment container 2 according to the second embodiment is different from that of the first embodiment in an internal configuration of the ink outlet forming portion 22. The ink replenishment container 2 according to the second embodiment does not include the inner plug 42 and includes a film 28 as a flow path closing member instead. Hereinafter, details thereof will be described.

As illustrated in FIG. 7, the film 28 is attached to an opening 14 of the container body portion 21 in such a way as to cover the opening 14 in the ink outlet forming portion 22. An annular packing 29 is provided on the opening 14 on the opposite side of the film 28 from the opening 14. The film 28 is configured to be broken by insertion of an ink introduction needle to open an ink flow path communicating from the container body portion to an ink tank. That is, the film 28 blocks an ink outflow path 16 before the ink replenishment container 2 is used for the first time.

A slit valve 27 made of an elastic member such as a silicone film is provided in an ink outlet 15 formed in the ink outlet forming portion 22 to open and close the ink outlet 15. The slit valve 27 is provided above the film 28 in the direction of the central axis C, that is, provided downstream in the ink outflow direction during ink replenishment.

The slit valve 27 is provided with a plurality of slits (three in the present embodiment) that intersect at equal angular intervals (for example, at 120 degree intervals) with the center that substantially coincides with the central axis C as an intersection point. The slits are configured to be opened by being pushed wide inward from the outside of the ink outlet 15. That is, the slit valve 27, which is a normally closed valve, is opened by being pushed wide by a distal end of the ink introduction needle when the distal end of the ink introduction needle is inserted into the slit in the ink outlet 15. Then, the slit valve 27 is closed when the distal end of the ink introduction needle is drawn out from the slit.

In the second embodiment, similarly to the first embodiment, an engagement (first engagement 50) between the ink outlet forming portion 22 and the container body portion 21 is a threaded engagement, and an engagement (second engagement 60) between the cap 23 and the ink outlet forming portion 22 has a fitting structure that enables separation of the cap 23 and the ink outlet forming portion 22 from each other in the direction of the central axis C by relative movement in the direction of the central axis C. Therefore, it is possible to easily prevent ink from leaking when the threaded engagement between the ink outlet forming portion 22 and the container body portion 21 becomes loose due to an operation of opening the cap 23. Further, after ink replenishment, the ink replenishment container 2 can be reused by removing a part of the film 28 remaining on the opening 14.

According to the second embodiment, similar effects to (1) and (2) of the first embodiment described above can be achieved. Furthermore, since the slit valve 27 is used instead of a spring valve, the number of spring members and the number of members of the valve body 44 can be reduced, and the structure inside the ink outflow path 16 can be simplified as compared to the spring valve.

C. Third Embodiment

Figure 8:
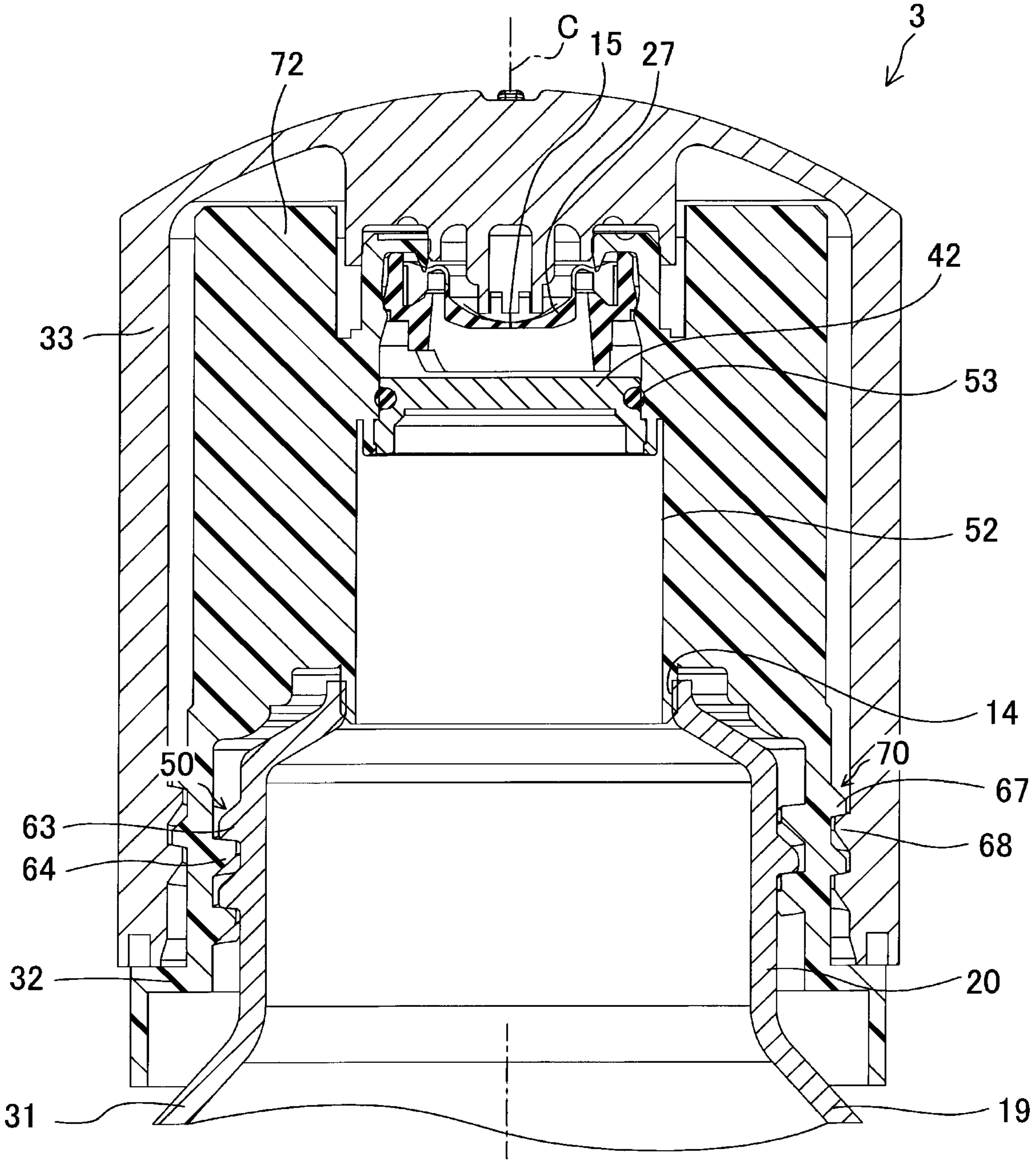
FIG. 8 is a cross-sectional view illustrating a part of an ink replenishment container according to a third embodiment.

Next, an ink replenishment container 3 according to a third embodiment of the present disclosure will be described with reference to FIG. 8. FIG. 8 is a cross-sectional view illustrating a part of the ink replenishment container 3 according to the third embodiment. FIG. 8 mainly illustrates a surrounding portion of a cap 33 of the ink replenishment container 3, and illustrates a cross section in a plane passing through a central axis C.

The ink replenishment container 3 according to the third embodiment is similar to that of the second embodiment in that the ink replenishment container 3 includes a container body portion 31, an ink outlet forming portion 32, the cap 33, and a slit valve 27. Furthermore, the ink replenishment container 3 according to the third embodiment includes an inner plug 42 similar to that of the first embodiment in an opening 14 of the container body portion 31. The ink replenishment container 3 according to the third embodiment is different from that of each embodiment described above in an engagement structure (second engagement 70) between the cap 33 and the ink outlet forming portion 32.

As illustrated in FIG. 8, also in the third embodiment, an engagement (first engagement 50) between the ink outlet forming portion 32 and the container body portion 31 is a threaded engagement as in each embodiment described above. In the third embodiment, the engagement (second engagement 70) between the cap 33 and the ink outlet forming portion 32 is also a threaded engagement. A female threaded portion 68 is formed on an inner circumference of a lower end of the cap 33. A male threaded portion 67 is formed on an outer circumference of the ink outlet forming portion 32 and protrudes outward in a radial direction.

When assembling the cap 33 to the ink outlet forming portion 32, the female threaded portion 68 of the cap 33 is engaged with the male threaded portion 67 of the container body portion 31 by the threaded engagement. Thereby, the cap 33 and the ink outlet forming portion 32 are coupled to each other.

Here, a fixing force of the first engagement 50 is greater than a fixing force of the second engagement 70. That is, the fixing force between the container body portion 31 and the ink outlet forming portion 32 is greater than the fixing force between the cap 33 and the ink outlet forming portion 32. Therefore, the container body portion 31 and the ink outlet forming portion 32 are not accidentally rotated and disassembled when the user rotates the cap 33 to remove the cap 33. A difference in fixing force results from a difference in loosening torque at a threaded fixing portion.

According to the third embodiment, similar effects to (1) and (2) of the first embodiment described above can be achieved. Furthermore, since the difference in fixing force between the first engagement 50 and the second engagement 70 results from the difference in loosening torque in the threaded engagement, a special structure is not required to provide the difference in fixing force, so that a simple configuration can be achieved.

D. Other Embodiments (D1) In the first embodiment, a valve having a different structure such as the slit valve 27 as illustrated in FIG. 7 may be used instead of the spring valve 17.

(D2) In the first embodiment and the third embodiment, the inner plug 42 does not have to be provided.

(D3) In the third embodiment, a valve having a different structure such as the spring valve 17 as illustrated in FIG. 3 may be used instead of the slit valve 27.

(D4) In the first embodiment, the side wall portion 49 including the contact portion 51 and the valve body 44 may be separate bodies. Even when the side wall portion 49 and the valve body 44 are separate bodies, the side wall portion 49 may be held by the holder portion 46, so that the valve unit 300 can be attached and detached as a whole when the valve unit 300 is reused, cleaned, replaced, or the like. Therefore, high handleability and convenience can be achieved.

The present disclosure is not limited to the embodiments described above, and can be implemented in various configurations without departing from the scope of the present disclosure. For example, the technical features in the above embodiments corresponding to the technical features in each form described in the "Summary" section can be appropriately replaced or combined to solve some or all of the above-described problems or to achieve some or all of the above-described effects. Further, when the technical features are not described as essential in the present specification, the technical features can be deleted as appropriate.

(1) According to one aspect of the present disclosure, a liquid replenishment container is provided. The liquid replenishment container is a liquid replenishment container that replenishes a liquid in a liquid ejecting apparatus including a liquid introduction needle via the liquid introduction needle, the liquid replenishment container including: a container body portion having an opening and configured to contain the liquid; a liquid outlet forming portion coupled to the container body portion and including a cylindrical portion that defines a liquid outflow path communicating with the opening; and a cap configured to be attached to and detached from the liquid outlet forming portion, in which the liquid outlet forming portion includes a valve disposed in the liquid outflow path, and when an engagement between the container body portion and the liquid outlet forming portion is a first engagement, and an engagement between the liquid outlet forming portion and the cap is a second engagement, the first engagement is a threaded engagement, and the second engagement has a fitting structure configured to be released in an axial direction without rotation. According to this aspect, the liquid outlet forming portion and the container body portion are engaged by the threaded engagement, so that the liquid outlet forming portion and the container body portion can be separated from each other. Therefore, convenience in reusing the liquid outlet forming portion and the container body portion is improved. Specifically, it becomes easy to re-inject ink into the container body portion, clean each member, and replace members that require replacement after removing the liquid outlet forming portion. Further, the cap and the liquid outlet forming portion are not engaged by the threaded engagement, but are fitted so that the cap and the liquid outlet forming portion can be separated in the axial direction. In other words, when the user pulls the cap in the axial direction to remove the cap from the liquid outlet forming portion, the threaded engagement between the liquid outlet forming portion and the container body portion are not released. Therefore, it is possible to prevent the liquid outlet forming portion from accidentally being separated from the container body portion. Accordingly, it is possible to prevent the user from being contaminated by the liquid due to an operation such as removing the cap.

(2) In the liquid replenishment container according to the aspect, the liquid outlet forming portion may include a sealing member disposed downstream of the valve in a liquid outflow direction of the liquid outflow path, and an inner plug disposed in the liquid outflow path between the opening and the valve, the inner plug being engaged with the liquid outlet forming portion in such a way as to be detachable by being pressed by the liquid introduction needle via the valve, and the valve may include a spring member, a valve body that comes into contact with the sealing member by being urged by the spring member in a valve-closed state and is separated from the sealing member by being pressed by the liquid introduction needle inserted into the liquid outflow path in a valve-open state, and a contact portion that moves in conjunction with the valve body at least in the valve-open state and comes into contact with the inner plug. According to this aspect, the inner plug is simply removed. When the inner plug is a component that breaks, it is necessary to remove the remaining part at the time of reuse. However, the inner plug does not require such removal processing, and it is sufficient that a new inner plug or a reused inner plug is engaged with the liquid outlet forming portion again, which facilitates recycling.

(3) In the liquid replenishment container according to the aspect, the valve may be a slit valve in which one or more slits are formed in an elastic member and which is opened when the slit is pushed wide by the liquid introduction needle and is closed when the liquid introduction needle is drawn out from the slit, a film that blocks a liquid flow may be disposed on the opening or in the liquid outflow path between the opening and the valve, and the film may be configured to break by insertion of the liquid introduction needle into the opening or the liquid outflow path to open the liquid outflow path. According to this aspect, since the slit valve is used instead of the spring valve, the number of spring members and the number of members of the valve body can be reduced, and the structure inside the liquid flow path can be simplified as compared to the spring valve. Furthermore, since the film breaks by the liquid introduction needle, leakage of ink is suppressed during the first use until the liquid replenishment container is coupled to the liquid introduction needle.

(4) According to a second aspect of the present disclosure, a liquid replenishment container is provided. The liquid replenishment container is a liquid replenishment container that replenishes a liquid in a liquid ejecting apparatus including a liquid introduction needle via the liquid introduction needle, the liquid replenishment container including: a container body portion having an opening and configured to contain the liquid; a liquid outlet forming portion coupled to the container body portion and including a cylindrical portion that defines a liquid outflow path communicating with the opening; and a cap configured to be attached to and detached from the liquid outlet forming portion, in which the liquid outlet forming portion includes a valve disposed in the liquid outflow path, and when an engagement between the container body portion and the liquid outlet forming portion is a first engagement, and an engagement between the liquid outlet forming portion and the cap is a second engagement, each of the first engagement and the second engagement has a threaded fixing structure and is configured to be released by rotation, and a fixing force of the first engagement is greater than a fixing force of the second engagement. According to this aspect, the liquid outlet forming portion and the container body portion are engaged by a threaded engagement, so that the liquid outlet forming portion and the container body portion can be separated from each other at the time of reusing the liquid replenishment container. On the other hand, since the fixing force of the first engagement is greater than the fixing force of the second engagement, it is possible to prevent the container body portion and the liquid outlet forming portion from accidentally rotating together when the user rotates the cap to remove the cap, thereby preventing the user from being contaminated by the liquid.

(5) In the liquid replenishment container according to the aspect, a difference in fixing force between the first engagement and the second engagement may result from a difference in loosening torque. According to this aspect, no special structure is required to provide a difference in fixing force between the first engagement and the second engagement, so that the liquid replenishment container can have a simple configuration.

Further, the present disclosure is applicable not only to an ink jet type but also to a liquid replenishment container that replenishes a liquid in any liquid ejecting apparatus that ejects a liquid other than ink.

What is claimed is:

1. A liquid replenishment container that replenishes a liquid in a liquid ejecting apparatus including a liquid introduction needle via the liquid introduction needle, the liquid replenishment container comprising:

a container body portion having an opening and configured to contain the liquid;

a liquid outlet forming portion having a liquid outlet, the liquid outlet forming portion coupled to the container body portion and including a cylindrical portion that defines a liquid outflow path communicating with the opening; and a cap configured to be attached to and detached from the liquid outlet forming portion, wherein the liquid outlet forming portion includes a valve disposed in the liquid outflow path, when an engagement between the container body portion and the liquid outlet forming portion is a first engagement, and an engagement between the liquid outlet forming portion and the cap is a second engagement, the first engagement is a threaded engagement, and the second engagement has a non-threaded fitting structure configured to be released in an axial direction without rotation, and the second engagement is disposed on an outer surface of the liquid outlet forming portion at a position away from the liquid outlet.

2. The liquid replenishment container according to claim 1, wherein the liquid outlet forming portion includes a sealing member disposed downstream of the valve in a liquid outflow direction of the liquid outflow path, and an inner plug disposed in the liquid outflow path between the opening and the valve, the inner plug being engaged with the liquid outlet forming portion in such a way as to be detachable by being pressed by the liquid introduction needle via the valve, and the valve includes a spring member, a valve body that comes into contact with the sealing member by being urged by the spring member in a valve-closed state and is separated from the sealing member by being pressed by the liquid introduction needle inserted into the liquid outflow path in a valve-open state, and a contact portion that moves in conjunction with the valve body at least in the valve-open state and that comes into contact with the inner plug.

3. The liquid replenishment container according to claim 1, wherein the valve is a slit valve in which one or more slits are formed in an elastic member and which is opened when the slit is pushed wide by the liquid introduction needle and is closed when the liquid introduction needle is drawn out from the slit, a film that blocks a liquid flow is disposed on the opening or in the liquid outflow path between the opening and the valve, and the film is configured to break by insertion of the liquid introduction needle into the opening or the liquid outflow path to open the liquid outflow path.

4. The liquid replenishment container according to claim 1, wherein the second engagement is positioned closer to the container body portion than the valve is.

5. A liquid replenishment container that replenishes a liquid in a liquid ejecting apparatus including a liquid introduction needle via the liquid introduction needle, the liquid replenishment container comprising:

a container body portion having an opening and configured to contain the liquid;

a liquid outlet forming portion coupled to the container body portion and including a cylindrical portion that defines a liquid outflow path communicating with the opening; and a cap configured to be attached to and detached from the liquid outlet forming portion, wherein the liquid outlet forming portion includes a valve disposed in the liquid outflow path, when an engagement between the container body portion and the liquid outlet forming portion is a first engagement, and an engagement between the liquid outlet forming portion and the cap is a second engagement, the first engagement is a threaded engagement, and the second engagement has a fitting structure configured to be released in an axial direction without rotation, the liquid outlet forming portion includes a sealing member disposed downstream of the valve in a liquid outflow direction of the liquid outflow path, and an inner plug disposed in the liquid outflow path between the opening and the valve, the inner plug being engaged with the liquid outlet forming portion in such a way as to be detachable by being pressed by the liquid introduction needle via the valve, and the valve includes a spring member, a valve body that comes into contact with the sealing member by being urged by the spring member in a valve-closed state and is separated from the sealing member by being pressed by the liquid introduction needle inserted into the liquid outflow path in a valve-open state, and a contact portion that moves in conjunction with the valve body at least in the valve-open state and that comes into contact with the inner plug.

* * * * *